United States Patent [19]
Azzouni

[11] Patent Number: 6,070,703
[45] Date of Patent: Jun. 6, 2000

[54] ADJUSTABLE CONTACT SHOE ASSEMBLY FOR A TRAIN

[76] Inventor: Ghassan Hassan Azzouni, 48-50 37th St., Long Island City, N.Y. 11101

[21] Appl. No.: 09/109,627

[22] Filed: Jul. 2, 1998

[51] Int. Cl.⁷ ..................................................... B60L 5/00
[52] U.S. Cl. .......................................... 191/49; 191/45 R
[58] Field of Search .................................... 191/45 R, 49, 191/59, 59.1, 60.1, 60.3

[56] References Cited

U.S. PATENT DOCUMENTS

| | | | |
|---|---|---|---|
| 1,308,534 | 7/1919 | Taylor | 191/49 |
| 1,308,544 | 7/1919 | Howe | 191/49 |
| 1,754,016 | 4/1930 | Hershberger | 191/49 |
| 4,042,081 | 8/1977 | Pier . | |
| 5,669,472 | 9/1997 | Azzouni | 191/49 |
| 5,669,482 | 9/1997 | Mojden et al. . | |

Primary Examiner—Mark T. Le
Attorney, Agent, or Firm—Collard & Roe, P.C.

[57] ABSTRACT

A contact shoe assembly for a train movable along a support track having an electrically-energized power rail extending substantially parallel with the support track. The contact shoe assembly includes a support member with two spaced-apart guide channels and can bend the shoe away from the power rail. A bracket arm is positioned between the guide channels and equipped with ball bearings that roll within the guide channels. A contact shoe is connected to a lower outwardly-extending portion of the bracket arm for contacting the power rail. A spring mounted between the support member and the bracket arm biases the contact shoe into a yielding engagement with the power rail. Vertical movement of the bracket arm responsive to a varying height of the power rail maintains the contact surface of the contact shoe horizontal and parallel to the power rail. When the shoe rides up on a safety board or other obstruction, the upper portion of the guide channels bend the contact shoe upward, away from the power rail, and toward the side of the train, until the obstruction is cleared.

4 Claims, 3 Drawing Sheets

ADJUSTABLE CONTACT SHOE ASSEMBLY FOR A TRAIN

BACKGROUND OF THE INVENTION

1. Field of the Invention

The invention relates to a contact shoe assembly for an electric train. More particularly, it relates to a contact shoe assembly in which the contact shoe moves vertically and can bend backward to ensure full contact with upwardly-facing power rails and any obstructions that lie on the power rails.

2. The Prior Art

Contact shoes are known according to the prior art for providing power to electric trains by sliding along a power rail that extends parallel to the support track. The contact shoe extends laterally outwardly from a lower part of the train to which it is mounted. The relative height of the power rail with respect to the support track varies due to numerous factors. Various track systems exist which specify different distances between the power rail and the support track. At grade crossings or track junctures, the power rail tapers off to provide necessary gaps therebetween. In addition, normal wear resulting from use causes variations in the height of the power rail. As a result, the contact shoe is required to move to maintain contact with the power rail as its position varies.

Typically, the arm carrying the contact shoe is pivotally mounted, as can be seen in U.S. Pat. No. 4,042,081. While the pivoting arm allows the contact shoe to effectively move vertically, the contact shoe is oriented horizontally at only one position. At all other heights, the contact shoe is oriented at an angle which results in uneven wear on the contact shoe and the power rail. While purely vertical height adjustment on the contact shoe is known from U.S. Pat. No. 1,308,534, this device is complex and difficult to adjust. In my earlier U.S. Pat. No. 5,669,482, an adjustable contact shoe for power rails is shown that can raise or lower itself as it travels over the power rail. However, the shoe can only move vertically, through a limited height, and cannot flip out of the way if an obstruction such as the rail covering board accidentally drops onto the power rail. Therefore, no prior art discloses a contact shoe assembly which can accommodate an upwardly-facing power rails, and flip backwards, out of the way if an obstruction, such as a rail board drops onto the power rail.

SUMMARY OF THE INVENTION

It is therefore an object of the present invention to provide an adjustable contact shoe assembly where the contact shoe moves vertically so that it is always parallel and in full contact with the power rail, and can also move out of the way, when raised near the top of its travel.

It is a further object of the present invention to provide an adjustable contact shoe assembly which is simple in design, easy to manufacture, and reliable in operation.

These and other related objects are achieved according to the invention by a contact shoe assembly having a support member which can be adjustably bolted onto the train at various heights to roughly adjust its position. The support member includes a pair of guide channels mounted on one side thereof facing the power rail. An L-shaped bracket arm is located between the guide channel and includes outwardly-extending ball bearings which ride within the guide channels to direct vertical and backward movement of the bracket arm. A contact shoe is connected to the lower outwardly-extending portion of the bracket arm.

A piston-cylinder arrangement along with a spring is mounted between the support member and the bracket arm for biasing the contact shoe into yielding engagement with the power rail. The varying height of the power rail causes vertical movement of the bracket arm. Such vertical movement ensures that the contact shoe during normal operation remains horizontal and parallel to the power rail. This parallel relationship ensures complete contact with the power rail and reduces wear on both the contact shoe and the power rail.

The contact shoe includes a tongue portion which is selectively received in a groove of the bracket arm to orient the contact shoe in a downwardly-facing position. The tongue-and-groove assembly also includes an electrically-conductive material lining the groove and a spring plate biased onto the contact shoe for effectively transmitting electrical energy from the contact shoe. The piston-cylinder arrangement is then mounted externally between the support member and the bracket arm to bias the bracket arm downwardly. A threaded rod is disposed on at least one end of the piston-cylinder arrangement to adjust the pre-determined upper or lower position of the contact shoe, depending on the application.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
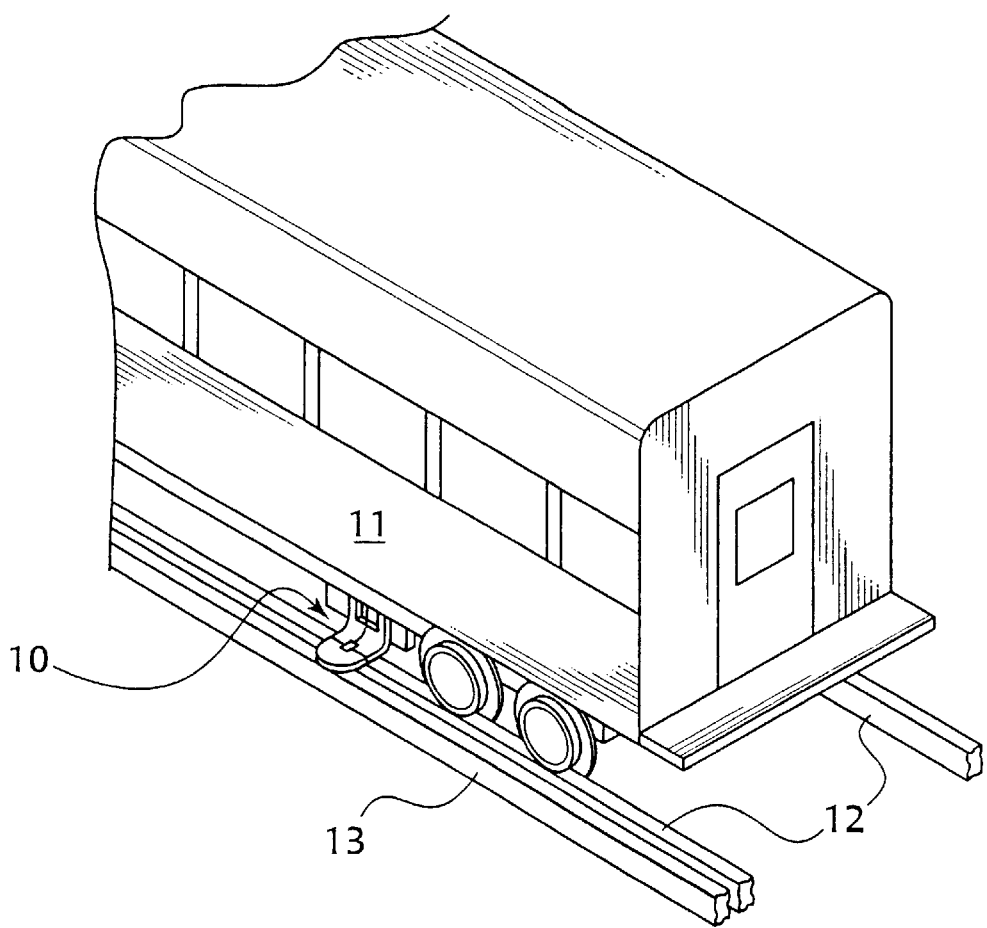
FIG. 1 is a perspective view of an electric train showing the outwardly-extending contact shoe in sliding engagement with the power rail.

Referring now in detail to the drawings and, in particular, FIG. 1, there is shown a contact shoe assembly 10 according to the invention mounted on the lower part of an electric train 11 which moves along a support track 12. Contact shoe assembly 10 extends laterally outwardly from train 11 to contact a power rail 13 which extends substantially in parallel with support track 12.

Figure 2A:
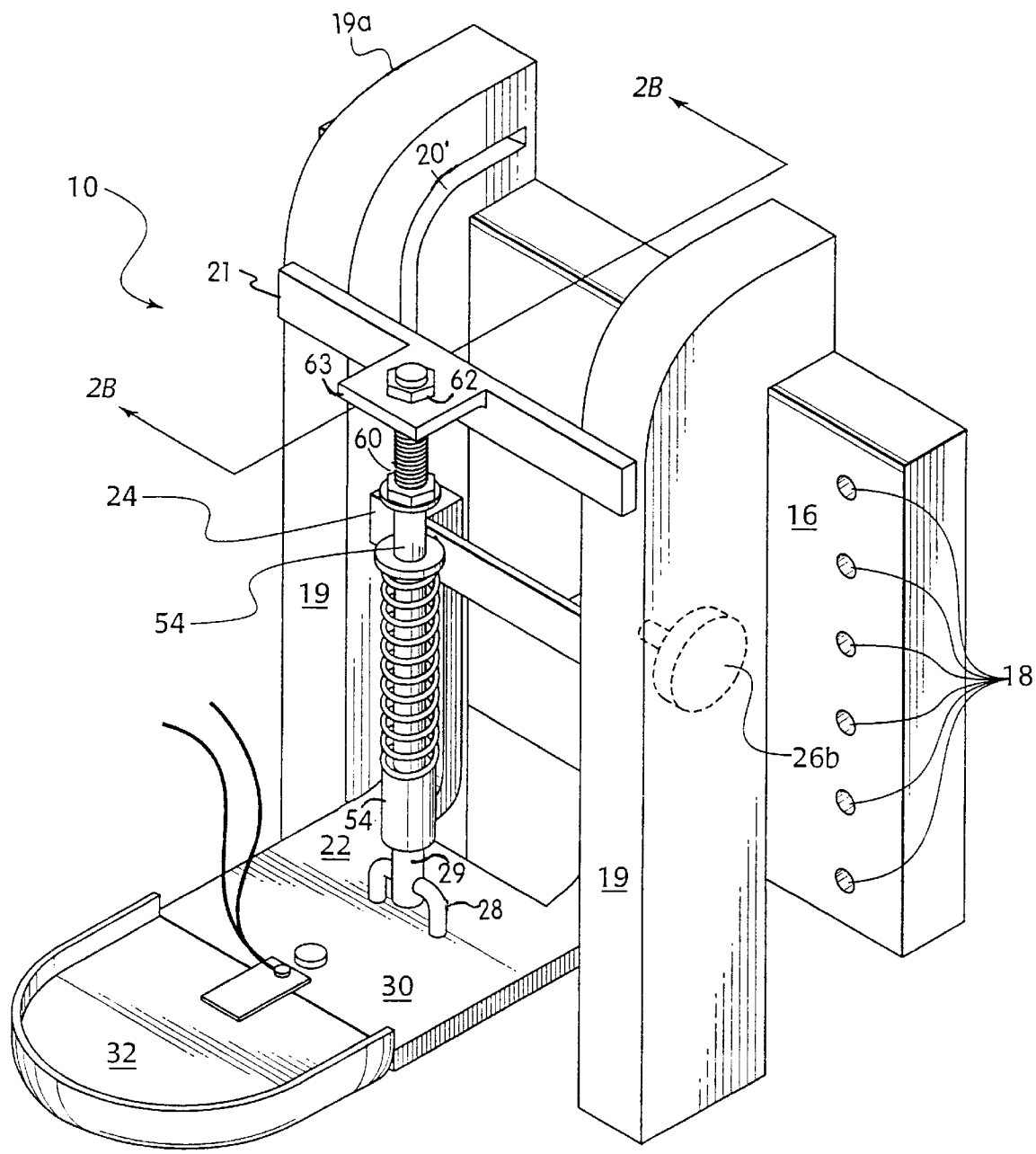
FIG. 2A is a perspective view of the contact shoe assembly according to the invention configured for an upwardly-facing power rail.
Figure 2B:
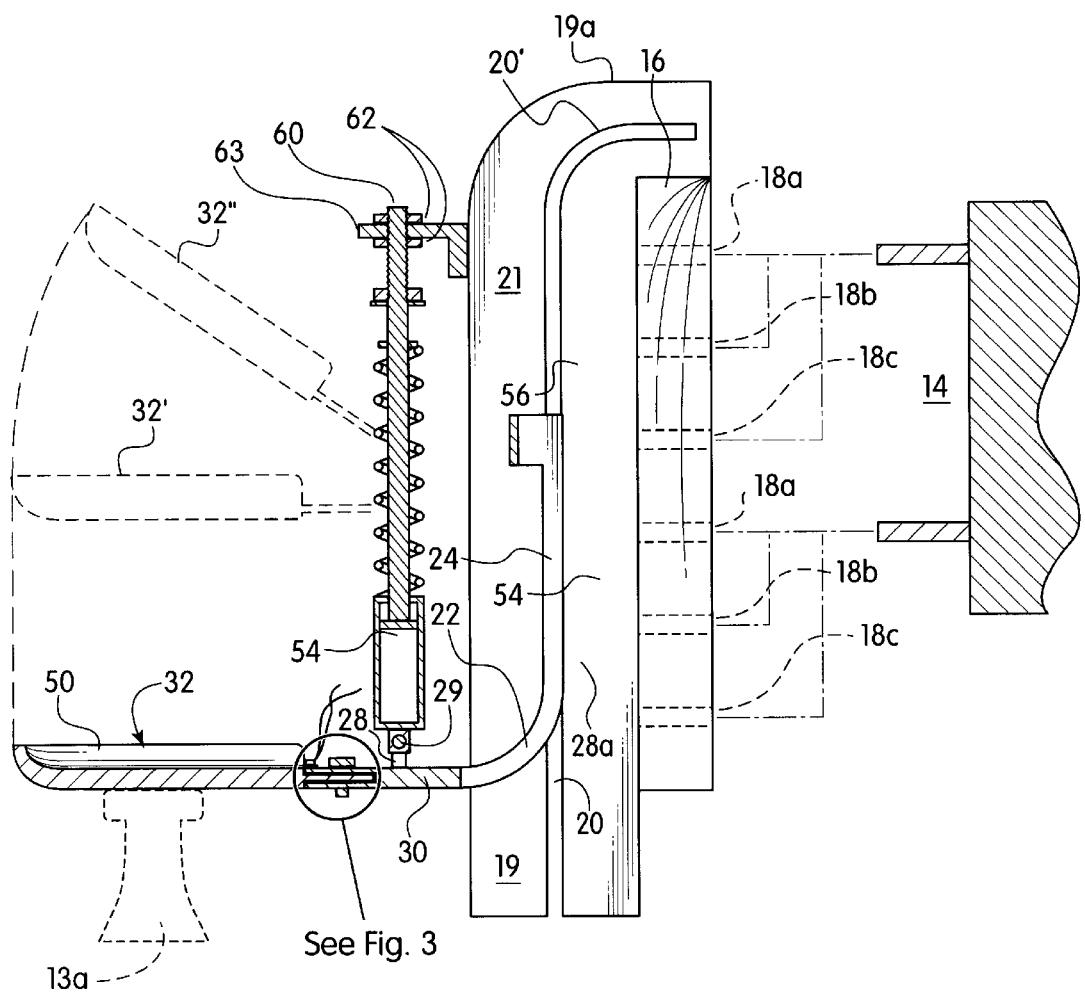
FIG. 2B is a cross-sectional view taken along the line 2B—2B from FIG. 2A.

As can be seen in FIGS. 2A and 2B, contact shoe assembly 10 includes a support member 16 provided with two vertical rows of spaced-apart apertures 18. Train 11 is equipped with a set of mounting bolts 14, which are spaced to engage matching pairs of apertures. Matching pairs of apertures 18a, 18b and 18c are spaced from each other by the same distance as mounting bolts 14. Thus, apertures 18a, 18b or 18c may be selected to adjust the mounting position of support member 16 on train 11.

On the lateral surface of support member 16, which faces the power rail, there is provided a pair of spaced-apart guide channels 19 which consist of hollow blocks with vertical slots 20 facing each other which terminated at the top in a curved portion 20' which ends in a horizontal slot. An L-shaped bracket arm 22 is positioned between and in front of guide channels 19, and includes a support portion 24 which rotatably supports two sets of outwardly-extending ball bearings 26a and 26b. The axles which support ball bearings 26a and 26b extend through slots 20. Ball bearings 26a and 26b then roll up and down along the hollow interior of the block comprising guide channels 19. Each guide channel accommodates four ball bearings, for example. The upper two ball bearings 26a roll against the back wall of the guide channel and the lower two ball bearings roll against the front wall. This arrangement opposes the torque exerted by the power rail onto support member 22 in a clockwise direction.

Figure 3:
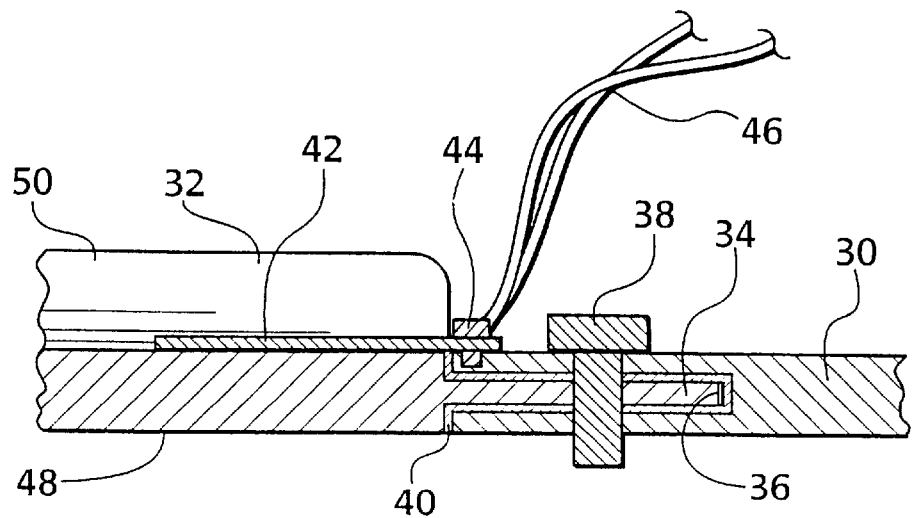
FIG. 3 is an enlarged view of the connection between the contact shoe and the bracket arm.

The lower portion of bracket arm 22 consists of a cantilevered portion 30, which is oriented approximately perpendicular to support portion 24. Cantilevered portion 30 also supports a pivot 28 which is coupled through a hole formed in shaft 29 at the end of piston cylinder assembly 54. At the free end of cantilevered portion 30, a contact shoe 32 is mounted with a tongue-and-groove connection, which can be seen most clearly in FIG. 3. A tongue 34 is located on contact shoe 32 which is received within a groove 36 and secured by a pin 38. A lining 40 of a highly conductive metal is provided around groove 36 and is electrically coupled to a spring plate 42. Spring plate 42 is attached to cantilevered portion 30 by a connector 44, which is electrically-connected to power supply cables 46. Power supply cables 46 transmit power from contact shoe 32, via metal lining 40 and spring plate 42, to the electrical systems of the train. The contact shoe includes a central planar portion 48 and a dish-shaped periphery 50 designed to avoid gouging of the power rail when the contact shoe re-engages the power rail following gaps in the power rail.

As can be seen in FIG. 2B, a piston-cylinder assembly 54 is provided with a coil spring 56 at one end. Coil spring 56 biases the piston-cylinder assembly 54 into an expanded position. The piston-cylinder assembly is connected between a support plate 63 and pivot bracket 28 mounted on portion 30. The lower end of piston-cylinder assembly 54 is attached to pivot bracket 28 through a hole in its bottom shaft 29 so that the shaft can pivot with respect to shoe 32. Support plate 63 is located near the upper portion of support member 16, and just below the curved back portion as guide channels 19. It is mounted on a cross member 21 which is secured to the front surfaces of guide channels 19. The curved top portions 19a of channels 19 terminate above insulated support member 16 and are designed not to touch the metal of train 11. The top portion of piston-cylinder assembly 54 consists of a threaded rod 60 equipped with lock nuts 62 to adjust the position of support plate 58a along threaded rod 60 with respect to support plate 63.

The adjustment of threaded rod 60 positions contact shoe 32 at a pre-determined lowered position corresponding to the expanded position of piston-cylinder assembly 54. This is the lowest position specified for any particular track system. Such lower position can be readily adjusted by rotating lock nuts 62, which are easily accessible. This lower position corresponds to the position where contact shoe 32 would come to rest in the absence of a power rail. This position is approximately midway along a power rail ramp, which is provided on either side of a gap in the power rail. As power rail 13a biases bracket arm 22 upwardly, ball bearings 26a and 26b provide low-friction rolling support so that bracket arm 22 moves vertically upwardly against the biasing force of coil spring 56. Piston-cylinder assembly 54 provides damping for vibrations associated with the sliding contact of contact shoe 32 with power rail 13a.

As shown in more detail in FIG. 2B, contact shoe 32 may move vertically during its travel along the lower portion of guide channels 19 and reach a height as shown in dotted line as contact shoe 32'. In this case, spring 56 and piston-cylinder assembly 54 would be compressed.

If the safety board which usually covers power rail 13a becomes dislodged and drops down onto the top surface of the power rail, shoe 32 may ride up higher than normal and it would be advantageous to have the shoe pivot out of the way of the safety board until normal conditions return.

When shoe 32 and its ball bearings 26a and 26b ride up toward the top of slot 20 and particularly into its curved portion, this will cause the support portion 24 to enter the curved portion 20' of slot 20 and pivot shoe 32 upward and out of the way from any obstructions underneath the shoe. Thus, when the obstruction is removed, shoe 32" can move downwardly and pivot back into a horizontal position and recontact power rail 13a. This represents an improvement over prior art devices which, under similar circumstances, might fracture or fail if the shoe contacts the upper portion of the safety board and is forced to travel vertically to an extreme limit.

Accordingly, while only several embodiments of the present invention have been shown and described, it is obvious that many changes and modifications may be made thereunto without departing from the spirit and scope of the invention.

What is claimed is:

1. A contact shoe assembly for mounting on the side of a train movable along a support track having an electrically-energized power rail extending substantially in parallel with the support track comprising:

a support member having two vertically-oriented, spaced-apart guide channels and adapted for mounting to the side of the train in operative relationship to the power rail wherein each guide channel comprises two spaced-apart, vertically-oriented parallel plates and having their top portion bending away from the power rail toward the side of the train;

a bracket arm disposed in between said guide channels and coupled to said guide channels for vertical movement, said bracket arm including:
   (i) ball bearing means for rolling engagement with said plates of respective guide channels;
   (ii) a support portion for supporting said ball bearing means; and
   (iii) a cantilevered portion coupled to said support portion, and approximately perpendicular thereto;

a contact shoe having a planar contact surface and connected to said bracket arm; and biasing means selectively mounted between said support member and said bracket arm and supported by said support portion, for biasing said contact shoe into yielding engagement with the power rail so that during vertical and horizontal movement of said bracket arm responsive to a varying height of the power rail, said planar contact surface moves from a horizontal portion, parallel to the power rail, to a vertical position away from the power rail.

2. The contact shoe assembly according to claim 1, wherein said biasing means comprises a piston-cylinder assembly for absorbing vibration and a spring coaxially-mounted on said piston-cylinder assembly for expanding said piston-cylinder assembly to a predetermined expanded position.

3. The contact shoe assembly according to claim 2, wherein said biasing means comprises threaded rods at opposite ends of said piston-cylinder assembly and correspondingly-threaded nuts for adjusting said predetermined upper and lower positions.

4. The contact shoe assembly according to claim 1, wherein said spaced apart guide channels each include a top portion which bend in a curve toward the side of the train so that when the contact shoe is elevated by an obstruction and said ball bearing means enters said curved top portion, the shoe is bent away from the power rail and toward a vertical position.

* * * * *